United States Patent [19]
Hecht et al.

[11] Patent Number: 6,071,046
[45] Date of Patent: Jun. 6, 2000

[54] DRILL

[75] Inventors: Gil Hecht, Hadera; Amir Satran, Kfar Vradim, both of Israel

[73] Assignee: Iscar, Ltd., Israel

[21] Appl. No.: 09/271,285

[22] Filed: Mar. 17, 1999

[30] Foreign Application Priority Data

Mar. 27, 1998 [IL] Israel ......................................... 123858

[51] Int. Cl.$^7$ .................................................. B23B 51/02
[52] U.S. Cl. ........................... 408/225; 408/224; 408/230
[58] Field of Search .................................. 408/225, 224, 408/230, 227, 223, 228, 229

[56] References Cited

U.S. PATENT DOCUMENTS

| | | |
|---|---|---|
| 2,334,089 | 11/1943 | Hallden . |
| 3,592,555 | 7/1971 | Mackey, Sr. .............................. 408/225 |
| 3,595,327 | 7/1971 | Self . |
| 4,116,580 | 9/1978 | Hall et al. ................................ 408/230 |
| 4,143,723 | 3/1979 | Schmotzer ............................... 408/230 |
| 4,222,690 | 9/1980 | Hosoi . |
| 4,342,368 | 8/1982 | Denman . |
| 4,373,839 | 2/1983 | Negishi et al. ............................. 408/59 |
| 4,565,471 | 1/1986 | Negishi et al. ........................... 408/204 |
| 4,728,231 | 3/1988 | Kunimori et al. ....................... 408/230 |
| 4,744,704 | 5/1988 | Galvefors et al. .................. 408/230 X |
| 4,753,562 | 6/1988 | Hirayoshi ................................. 408/230 |
| 4,878,788 | 11/1989 | Wakihira et al. ........................ 408/230 |
| 4,968,193 | 11/1990 | Chaconas et al. ....................... 408/230 |
| 5,074,729 | 12/1991 | Oba ......................................... 408/230 |
| 5,236,291 | 8/1993 | Agapiou et al. ......................... 408/230 |
| 5,423,640 | 6/1995 | Lindblom et al. ....................... 408/227 |
| 5,590,987 | 1/1997 | Bouzounie ............................... 408/230 |
| 5,716,172 | 2/1998 | Nakamura et al. ...................... 408/230 |
| 5,860,773 | 1/1999 | Blomberg et al. ....................... 408/224 |

FOREIGN PATENT DOCUMENTS

| | | |
|---|---|---|
| 0 207 025 A2 | 12/1986 | European Pat. Off. . |
| 0 298 061 B1 | 1/1989 | European Pat. Off. . |
| 0 320 881 B1 | 6/1989 | European Pat. Off. . |
| 3020948 | 12/1981 | Germany .............................. 408/230 |
| 96-9591 | of 1996 | Rep. of Korea . |

OTHER PUBLICATIONS

ASM International, Metals Handbook, Ninth Edt., vol. 16, Machining, pp. 226–117 "Traditional Machining Processes/Drilling".

*Primary Examiner*—William Briggs
*Attorney, Agent, or Firm*—Pennie & Edmonds LLP

[57] ABSTRACT

A drilling head has a cylindrical body with a longitudinal axis, tapering towards a leading end thereof. The drilling head comprises at least two chip evacuation flutes and at least two lands therebetween. Each flute has a first side all facing in the direction of rotation of the drilling head and a second side wall diverging outwardly from the first side wall and merging therewith via a web-thinning recessed surface extending towards this leading end. Each land is bound by the first wall of one adjacent flute and the second wall of another adjacent flute and has a generally radially extending and axially inclined front flank face tapering towards the leading end. The front flank face of each land intersects the first wall of one flute at a primary cutting edge, the web-thinning recessed surface of this flute at a secondary cutting edge, and the front flank face of the other land at a chisel edge which is disposed at the leading end of the drilling head and which passes through the longitudinal axis thereof. The chisel edge is concave and merges with the secondary cutting edges of the two lands via axially outermost extremities thereof which are spaced from the longitudinal axis.

8 Claims, 5 Drawing Sheets

DRILL

FIELD OF THE INVENTION

This invention relates to a drill having a drilling head either mounted thereto or formed integrally therewith, and having a longitudinal axis of rotation. The invention particularly refers to the drilling head of such a drill, which is formed with chip evacuation flutes and lands therebetween and which tapers towards a substantially point-like leading end thereof.

BACKGROUND OF THE INVENTION

Different design modifications of the point-like leading end of a drilling head of the above specified kind are discussed in *Metals Handbook* (Ninth Edition), Vol. 16, pp. 226–227, 1989, USA. The particular type of the drill point design to which the present invention refers is shown in FIG. 23 on page 227 of this Handbook.

According to this particular design of the drilling head, each of its chip evacuation flutes has a first side wall facing in the direction of rotation of the drilling head, a second side wall diverging outwardly from the first side wall, and a web-thinning recessed surface formed therebetween adjacent the leading end of the drilling head and extending towards this leading end, so that the web thickness, defined at the leading end of the drilling head by the distance between the web-thinning recessed surfaces, is minimal. Each land of the drilling head is bound by the first wall of one adjacent flute and the second wall of another adjacent flute, and has a generally radially extending and axially inclined front flank face, which tapers towards the leading end of the drilling head. The front flank face of each land intersects the associated first wall of the flute at a primary cutting edge, intersects the associated web-thinning recessed surface of the same flute at a secondary cutting edge, and intersects the front flank surface of the other land at a chisel edge which is disposed at the leading end of the drilling head and passes through the axis of rotation of the twist drill.

With the above geometry of the leading end of the drilling head, the width of the chisel edge is essentially reduced when compared with other drill point designs, whereby the thrust exerted on the leading end of the drilling head during drilling is reduced and the cutting efficiency at the center of the drilling head and the centering capability thereof are improved.

Drilling heads similar to that described above are disclosed in further detail in EP 320 881 and KR 96-9591.

However, since it is practically impossible to provide an ideal point chisel edge, i.e. having a zero width, the above drilling heads still encounter problems connected with their centering capability as well as with their cutting at the center of the drill.

It is therefore the object of the present invention to provide a new drilling head having advantages in the above respect.

SUMMARY OF THE INVENTION

According to the present invention, there is provided a drilling head having a cylindrical body with a longitudinal axis, tapering towards the leading end thereof, said drilling head comprising at least two chip evacuation flutes and at least two lands therebetween;

each flute having a first side wall facing in the direction of rotation of the drilling head and a second side wall diverging outwardly from the first side wall and merging therewith, adjacent the leading end of the drilling head, via a web-thinning recessed surface extending towards said leading end;

each land being bound by said first wall of one adjacent flute and said second wall of another adjacent flute and having a generally radially extending and axially inclined front flank face, tapering towards said leading end;

said front flank face of each land intersecting the first wall of said one flute at a primary cutting edge, intersecting the web-thinning recessed surface of said one flute at a secondary cutting edge, and intersecting the front flank face of the other land at a chisel edge which is disposed at the leading end of the drilling head and which passes through said longitudinal axis;

characterised in that said chisel edge is concave and merges with the secondary cutting edges of the two lands via axially outermost extremities thereof which are spaced from said axis.

With the geometry of the chisel edge according to the present invention, the axially outermost extremities thereof function as 'piloting' points and enhance the centering capability of the drilling head. Moreover, sections of the chisel edge extending between its innermost point and said outermost extremities effectively serve as chisel edge cutting sections.

Preferably, an axial distance between the innermost point of the chisel edge and its outermost extremities is substantially less than an axial projection of the secondary cutting edges.

Preferably, the chisel edge is provided with recesses formed in the front flank faces of the lands and extending away from the chisel edge, each recess providing one chisel edge cutting section with a chip rake surface and the other chisel edge cutting section with a relief surface. Still more preferably, the portion of each recess which constitutes the chip rake surface for its corresponding chisel edge cutting section, merges with an adjacent web-thinning recessed surface. Thereby, improved chip evacuation from the leading end of the drilling head and, particularly, from the chisel edge cutting sections, may be effectively obtained. Preferably, the recess merges with the adjacent web-thinning recessed surface at a ridge. Preferably, each recess terminates at a surface disposed remote from the chisel edge.

Preferably, the front flank face of each land comprises a major flank surface disposed adjacent the first wall of said one adjacent flute and extending along the primary and secondary cutting edge and terminating at the chisel edge, and a minor flank surface disposed adjacent the second wall of said another adjacent flute, said recesses being formed in the major flank surface.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF A PREFERRED EMBODIMENT

FIGS. 1 to 4 illustrate a drilling head according to the present invention. The drilling head has a longitudinal axis 0 and is designed to be coaxially coupled to a drill in any appropriate manner which does not constitute the subject matter of the present invention and, therefore, will not be described herein. When the drilling head is mounted on a drill, the longitudinal axis 0 constitutes the drill's axis of rotation.

Figure 1:
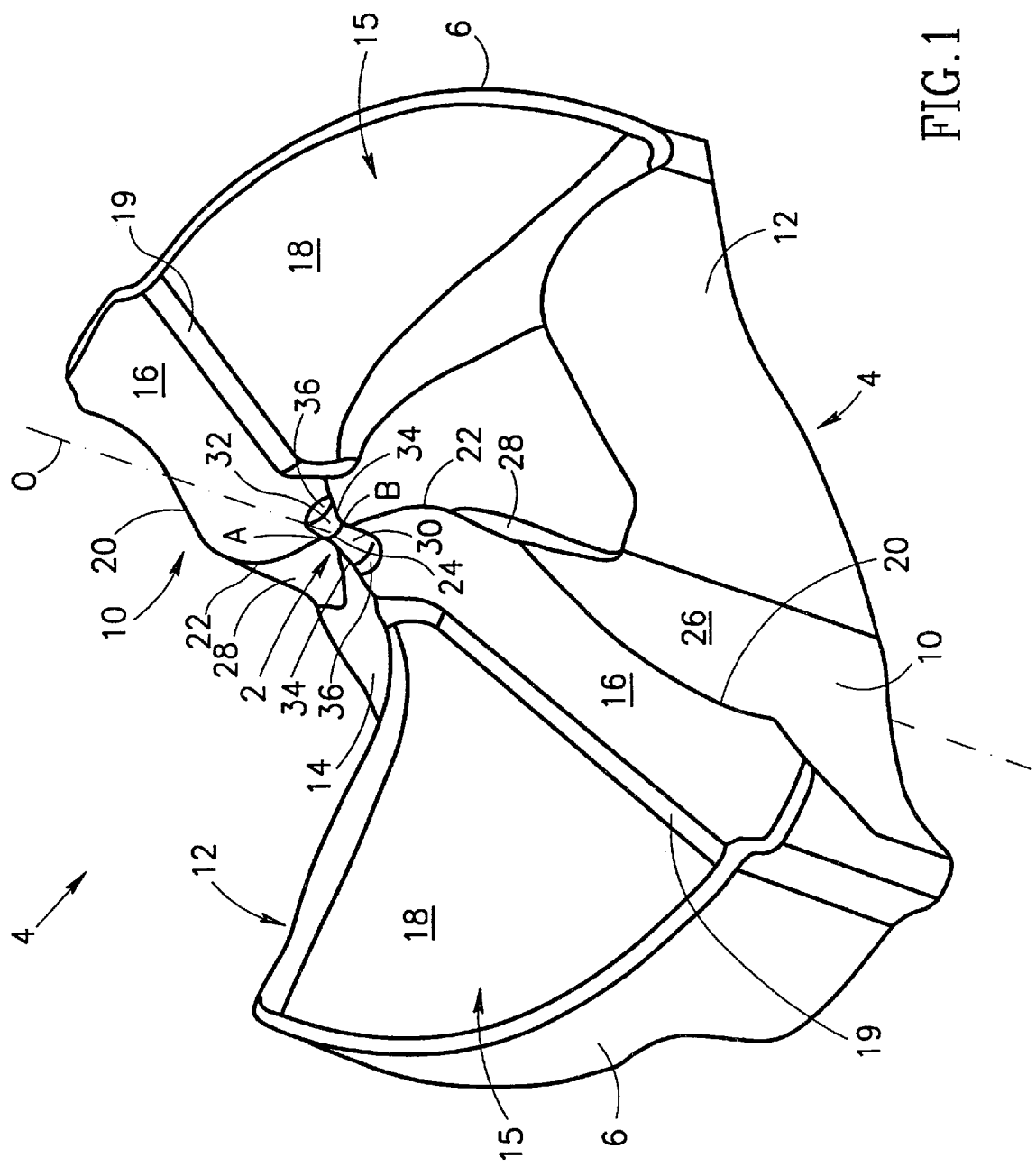
FIG. 1 is a perspective view of a drilling head according to the present invention.
Figure 2:
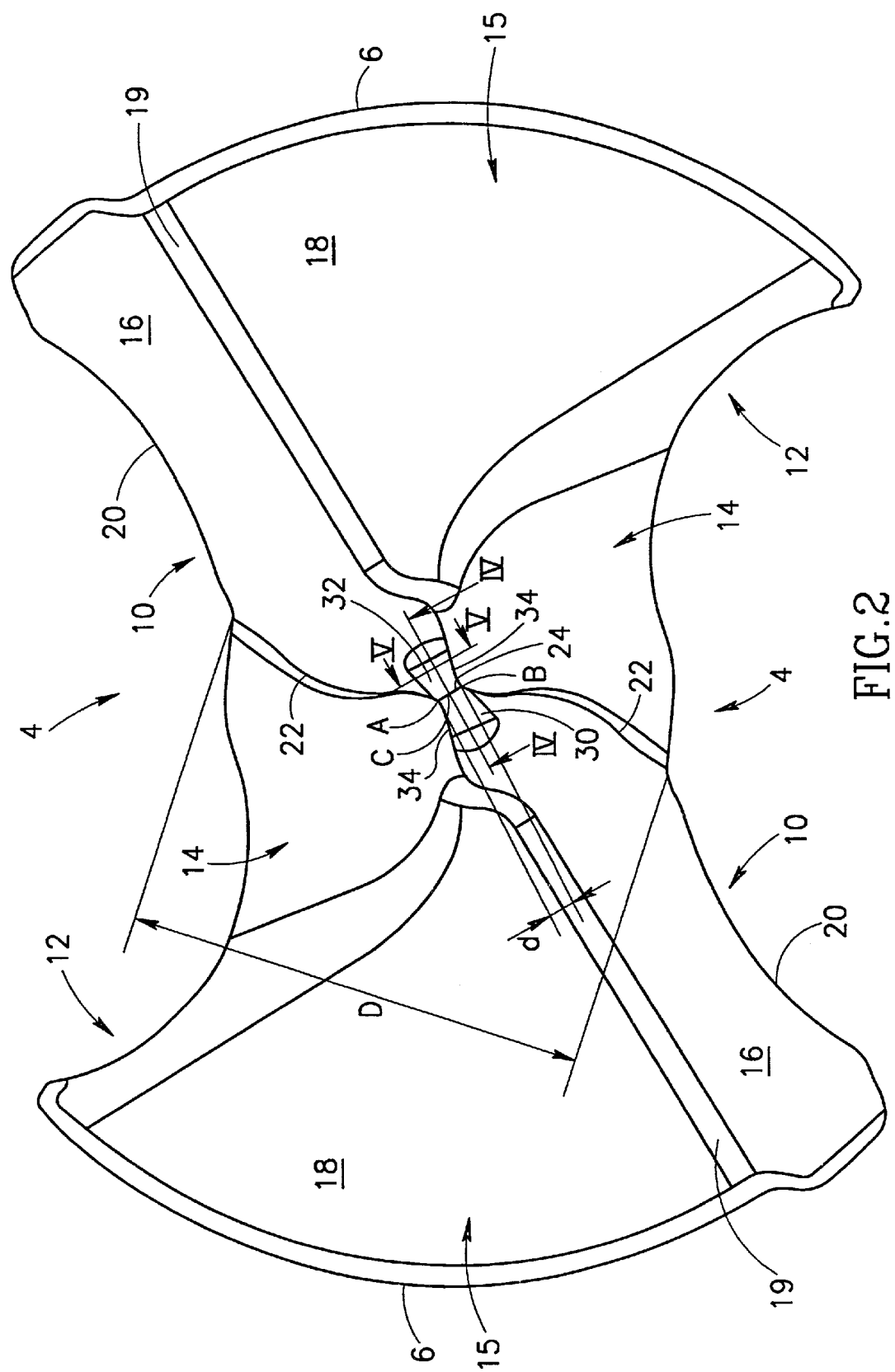
FIG. 2 is a front view of the drilling head shown in FIG. 1.

As seen in FIGS. 1 and 2, the drilling head has a cylindrical body 1 with a leading end 2, comprising a pair of identical chip evacuation flutes 4 and a pair of identical lands 6.

Each flute 4 has a first side wall 10 facing in the direction of rotation of the drilling head and a second side wall 12 diverging outwardly from the first side wall 10 and merging therewith, adjacent the leading end 2 of the drilling head, via a web-thinning recessed surface 14 extending towards the leading end 2 so that the web thickness defined by the distance between the web-thinning recessed surfaces 14 of the flutes 4 is minimal at the leading end 2. Thus, as seen in FIG. 2, the web thickness d at the leading end 2 of the drilling head is much smaller than the web thickness D remote therefrom.

Figure 3:
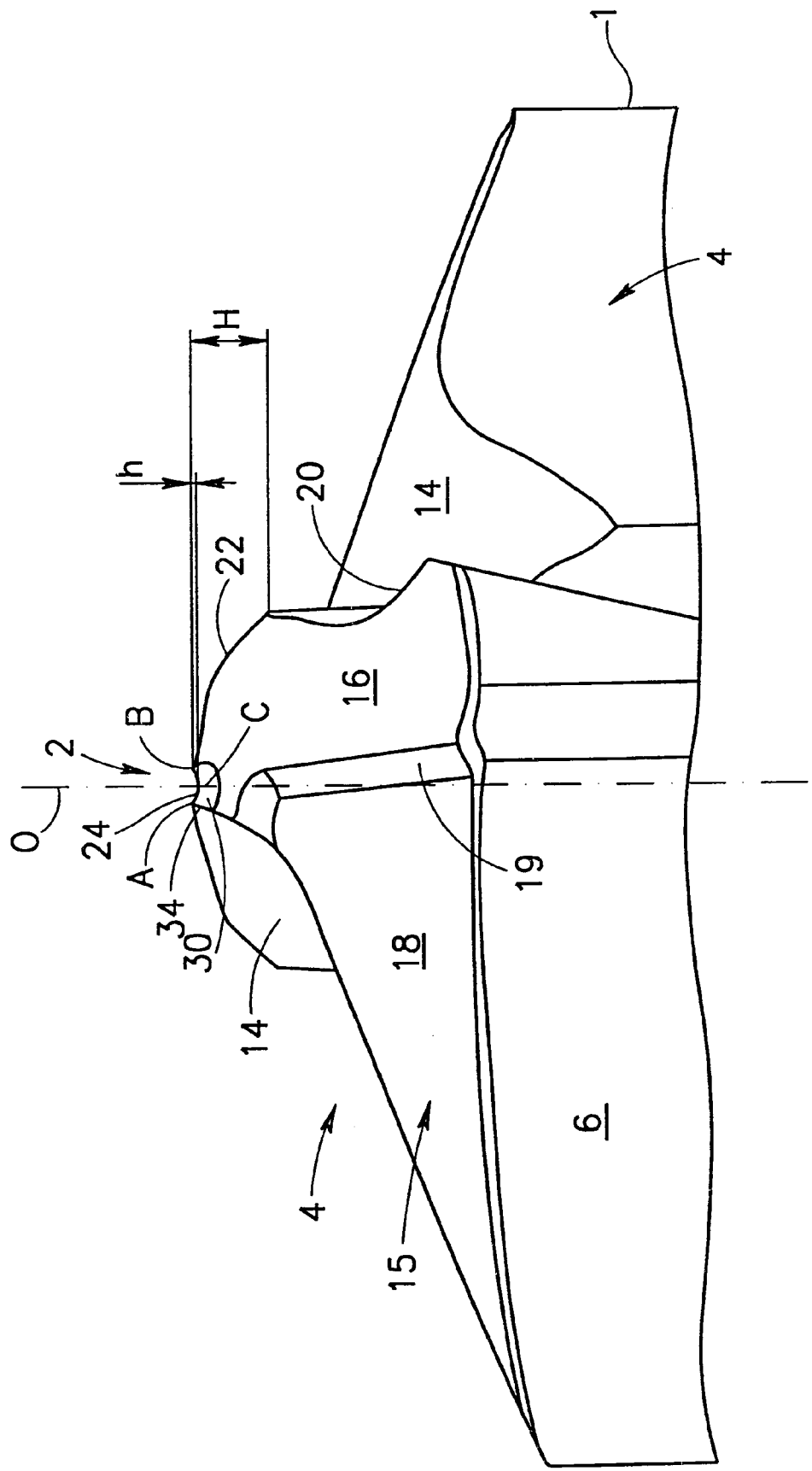
FIG. 3 is a side view of the drilling head shown in FIG. 1, in the direction perpendicular to a chisel edge thereof.
Figure 4:
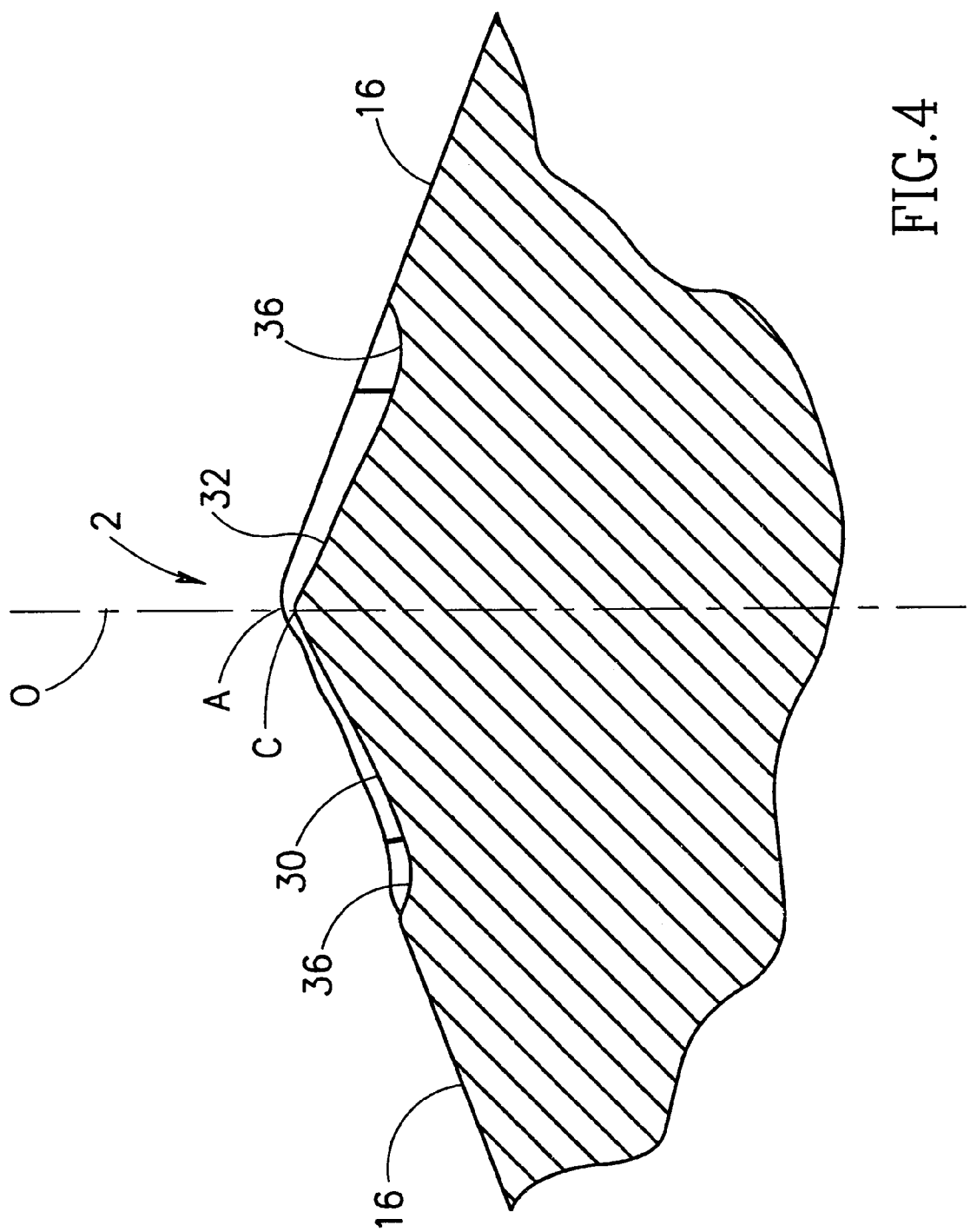
FIG. 4 is a cross-sectional view of the drilling head, taken along the line IV—IV in FIG. 2.

As seen in FIGS. 1 and 2, each land 6 is bound by the first side wall 10 of one adjacent flute 4 and the second side wall 12 of another adjacent flute 4. The land 6 has a front flank face 15 which, as seen in FIG. 3, extends generally radially and is inclined to the axis 0, the front flank 15 tapering towards the leading end 2 of the drilling head. With the geometry of the chip evacuation flutes 4 and lands 6 as described above, consequently, the drilling head has a shape generally tapering towards the leading end 2 thereof.

As seen in FIGS. 1 and 2, each front flank face 15 comprises a major flank surface 16 disposed adjacent the associated first wall 10, a minor flank surface 18 disposed adjacent the associated second wall 12, and a bridging step 19 therebetween.

The major flank surface 16 intersects the associated first wall 10 of one flute 4 at a substantially concave primary cutting edge 20, the associated web-thinning recessed surface 14 of the same flute at a substantially convex secondary cutting edge 22, and the major flank surface 16 of the other flute at a chisel edge 24 disposed at the leading end of the drilling head and constituting its axially outermost region.

To provide the primary and secondary cutting edges with appropriate cutting conditions, the major flank surface 16 is inclined relative to a plane normal to the axis of rotation so as to provide these cutting edges with required clearance angles. Also, a portion 26 of the first side wall 10 and a portion 28 of the web-thinning recessed surface 14 of each flute 4 which are disposed adjacent respective primary cutting edge 20 and secondary cutting edge 22 and which constitute chip surfaces thereof, are inclined with respect to the axis of rotation 0 so as to provide these cutting edges with required rake angles.

Figure 5:
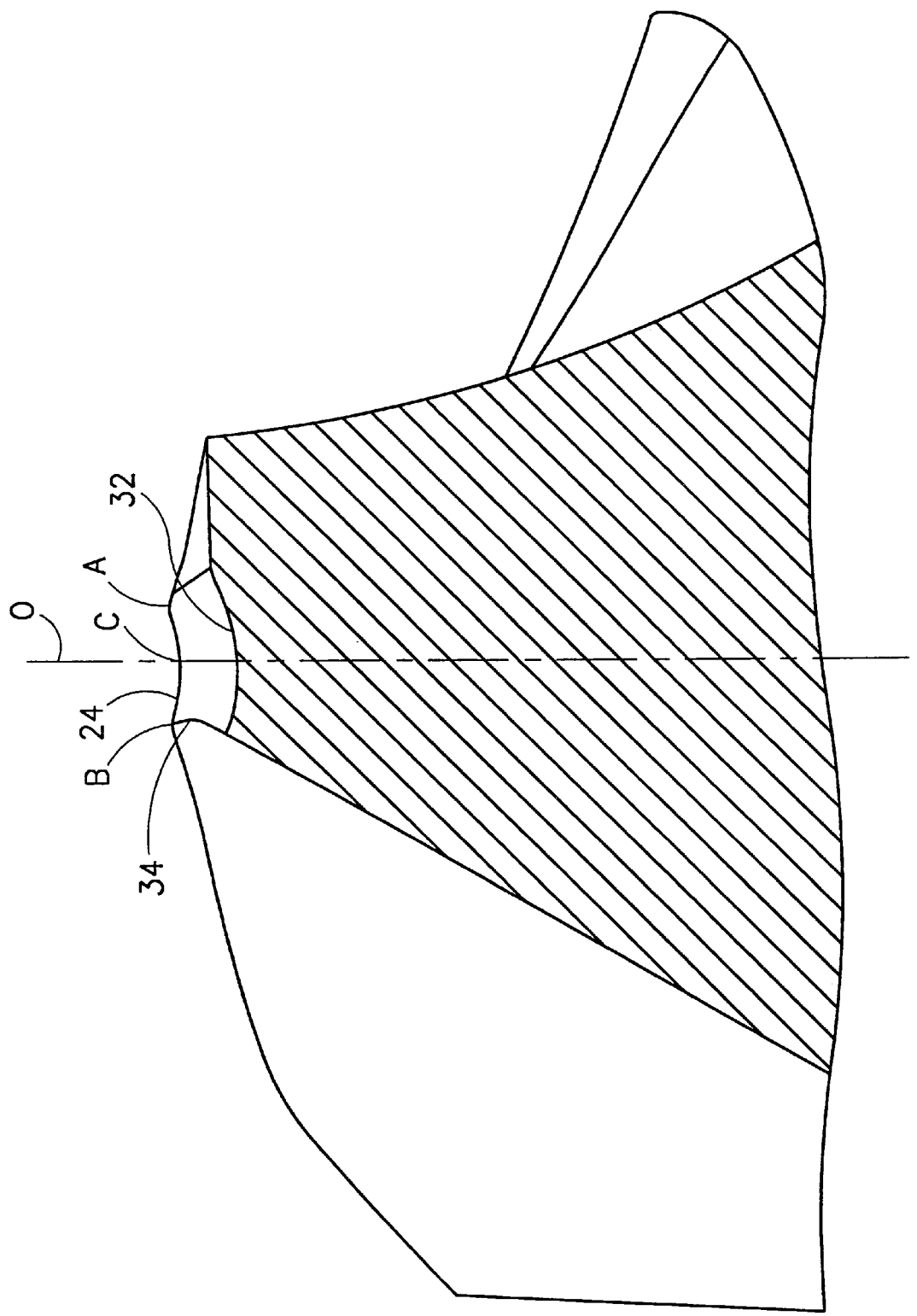
FIG. 5 is a cross-sectional view of the drilling head, taken along the line V—V in FIG. 2.

As seen in FIGS. 3 and 5, the chisel edge 24 is concave and has two axially outermost extremities A and B which are spaced from the axis 0 and an innermost point C which lies on the axis 0. As shown in FIG. 3, an axial distance h between the innermost point C of the chisel edge 24 and its outermost extremities A and B, is substantially less than the axial projection H of each secondary cutting edge 22. The width of the chisel edge 24 is defined by the distance between the extremities A and B.

With the above geometry of the chisel edge 24, the axially outermost extremities A and B are capable of fulfilling a piloting function during drilling, and, thereby, to facilitate the centering capability of the drilling head, without unduly weakening its leading end. In addition, curved sections AC and BC of the chisel edge 24 are capable of cutting.

As illustrated in FIGS. 1 and 2, the chisel edge 24 is provided with recesses 30 and 32 formed adjacent thereto in the major flank surfaces 16 and extending radially away from the chisel edge 24. The recess 30 provides the chisel edge cutting section AC with a chip rake surface and the chisel edge cutting section BC with a relief surface. Similarly, the recess 32 provides the chisel edge cutting section AC with a relief surface and the chisel edge BC with a chip rake surface.

Each recess 30, 32 merges, with its portion constituting the chip rake surface of the respective chisel edge cutting section AC, BC, with the adjacent web-thinning recessed surface 14 at a ridge 34. In addition, with reference to FIG. 4, each recess 30, 32 terminates at a surface 36 which is disposed remote from the chisel edge 24. The recesses 30, 32 allow for chip evacuation from the chisel edge cutting sections AC and BC.

The drilling head and, particularly, its leading end may have alternative designs not described above and not shown in the drawings. Thus, for example, the drilling head may be formed integrally with the drill rather than being adapted for mounting thereon. The drilling head may have more than two flutes and, consequently, more than two lands. The primary cutting edges do not have to be concave but rather may be straight or convex. The front flank faces of the lands may be continuous and do not necessarily have to be divided into minor and major flank surfaces. The recesses formed in the major flank surfaces adjacent the chisel edge may be of an asymmetric shape. The drilling head may have any other alternative features which are appropriate in view of the main concept of the present invention.

LIST OF REFERENCE NUMERALS 1 cylindrical body of the drilling head
2 leading end of the drilling head
4 chip evacuation flute
6 lands
10 first side wall of the flute
12 second side wall of the flute
14 web-thinning recessed surface
15 front flank face of the land
16 major flank surface
18 minor flank surface
19 step bridging the major and minor flank surfaces
20 primary cutting edge
22 secondary cutting edge
24 chisel edge
26 chip surface of the primary cutting edge
28 chip surface of the secondary cutting edge
30,32 recesses
34 ridge
36 surface of the termination of the recesses 30, 32
A,B outermost extremities of the chisel edge
C innermost point of the chisel edge
O axis of rotation

We claim:
1. A drilling head having a cylindrical body with a longitudinal axis, tapering towards a leading end thereof, said drilling head comprising at least two chip evacuation flutes and at least two lands therebetween;

each flute having a first side wall facing the direction of rotation of the drilling head and a second side wall diverging outwardly from the first side wall and merging therewith, adjacent the leading end of the drilling head, via a web-thinning recessed surface extending towards said leading end;

each land being bound by said first wall of one adjacent flute and said second wall of another adjacent flute and having a generally radially extending and axially inclined front flank face tapering towards said leading end; said front flank face of each land intersecting the first wall of said one flute at a primary cutting edge, intersecting the web-thinning recessed surface of said one flute at a secondary cutting edge, and intersecting the front flank face of the other land at a chisel edge which is disposed at the leading end of the drilling head and which passes through said longitudinal axis;

characterized in that said chisel edge is concave and merges with the secondary cutting edges of the two lands via axially outermost extremities thereof which are spaced from said axis, and wherein an axially innermost point of the chisel edge divides the chisel edge into two chisel edge cutting sections, and the chisel edge is provided with recesses formed in the front flank faces of the lands and extending away therefrom, each recess providing one chisel edge cutting section with a chip rake surface and the other chisel edge cutting section with a relief surface.

2. A drilling head according to claim 1, wherein an axial distance between an innermost point of the chisel edge and its outermost extremities is substantially less than an axial projection of the secondary cutting edges.

3. A drilling head having a cylindrical body with a longitudinal axis, tapering towards a leading end thereof, said drilling head comprising at least two chip evacuation flutes and at least two lands therebetween;

each flute having a first side wall facing in the direction of rotation of the drilling head and a second side wall diverging outwardly from the first side wall and merging therewith, adjacent the leading end of the drilling head, via a web-thinning recessed surface extending towards said leading end;

each land being bound by said first wall of one adjacent flute and said second wall of another adjacent flute and having a generally radially extending and axially inclined front flank face tapering towards said leading end; said front flank face of each land intersecting the first wall of said one flute at a primary cutting edge, intersecting the web-thinning recessed surface of said one flute at a secondary cutting edge, and intersecting the front flank face of the other land at a chisel edge which is disposed at the leading end of the drilling head and which passes through said longitudinal axis;

characterized in that said chisel edge is concave and merges with the secondary cutting edges of the two lands via axially outermost extremities thereof which are spaced from said axis, and an axial distance between an innermost point of the chisel edge and its outermost extremities is substantially less than an axial projection of the secondary cutting edges.

4. A drilling head according to claim 1, wherein each said recess merges, with its portion constituting said chip rake surface, with an adjacent web-thinning recessed surface.

5. A drilling head according to claim 4, wherein said recess merges with said adjacent web-thinning recessed surface at a ridge.

6. A drilling head according to claim 1, wherein each recess terminates at a surface disposed radially remote from the chisel edge.

7. A drilling head according to claim 1, wherein the front flank face of each land comprises a major flank surface disposed adjacent the first wall of said one adjacent flute and extending along the primary and secondary cutting edges and terminating at the chisel edge, and a minor flank surface disposed adjacent the second wall of said another adjacent flute, said recesses being formed in the major flank surface.

8. A drilling head according to claim 1, wherein each said recess merges, at its portion constituting said chip rake surface, with an adjacent web-thinning recessed surface.

* * * * *